United States Patent
Patil et al.

(10) Patent No.: US 10,075,403 B2
(45) Date of Patent: Sep. 11, 2018

(54) METHOD AND SYSTEM FOR MANAGING VOICE MAILS IN A UNIVERSAL PLUG AND PLAY NETWORK ENVIRONMENT

(75) Inventors: Mayuresh Madhukar Patil, Bangalore (IN); Basavaraj Jayawant Pattan, Bangalore (IN)

(73) Assignee: Samsung Electronics Co., Ltd (KR)

( * ) Notice: Subject to any disclaimer, the term of this patent is extended or adjusted under 35 U.S.C. 154(b) by 120 days.

(21) Appl. No.: 14/116,943

(22) PCT Filed: May 9, 2012

(86) PCT No.: PCT/KR2012/003647
§ 371 (c)(1),
(2), (4) Date: Nov. 11, 2013

(87) PCT Pub. No.: WO2012/153981
PCT Pub. Date: Nov. 15, 2012

(65) Prior Publication Data
US 2014/0089414 A1    Mar. 27, 2014

(30) Foreign Application Priority Data
May 9, 2011  (IN) ............................ 1608/CHE/2011

(51) Int. Cl.
*H04L 12/28* (2006.01)
*H04L 12/58* (2006.01)
(Continued)

(52) U.S. Cl.
CPC .......... *H04L 51/22* (2013.01); *H04L 12/2834* (2013.01); *H04L 51/24* (2013.01);
(Continued)

(58) Field of Classification Search
CPC ..... H04L 65/1036; H04L 51/22; H04L 51/24; H04L 12/2834; H04L 12/2803; H04M 3/53325; H04M 3/533; H04M 3/42221
(Continued)

(56) References Cited

U.S. PATENT DOCUMENTS 7,424,098 B2 *  9/2008  Kovales ................ H04M 3/487
                                                            379/76
9,014,343 B1 *  4/2015  Peden et al. ................ 379/67.1
(Continued)

FOREIGN PATENT DOCUMENTS

CN            1604576           4/2005

OTHER PUBLICATIONS

PCT/ISA/237 Written Opinion issued on PCT/KR2012/003647 (pp. 4).
(Continued)

*Primary Examiner* — David Lazaro
*Assistant Examiner* — Zi Ye
(74) *Attorney, Agent, or Firm* — The Farell Law Firm, P.C.

(57) ABSTRACT

The present invention relates to a method a system for managing one or more voice mails in a Universal Plug and Play (UPnP) network. In one embodiment, a method includes providing a notification indicating receipt of one or more voice mails to one or more Telephony Control Points (TelCPs) through a Universal Plug and Play (UPnP) home network and providing one or more voice mails to the one or more TelCPs. The method further includes providing a list of one or more voice mails to the one or more TelCPs. The method also includes deleting one or more voice mails from a telephony server (TS). Furthermore, the method includes composing one or more voice mail containing emotional symbols and depositing the one or more voice mails in a
(Continued)

voice mail server. Moreover, the method includes recalling one or more voice mails deposited in the voice mail server.

8 Claims, 4 Drawing Sheets

(51) Int. Cl.
    *G06F 15/16*           (2006.01)
    *H04J 3/16*            (2006.01)
    *H04M 3/533*         (2006.01)
    *H04M 3/537*         (2006.01)
    *H04M 3/42*           (2006.01)

(52) U.S. Cl.
    CPC ....... *H04M 3/42221* (2013.01); *H04M 3/533* (2013.01); *H04M 3/537* (2013.01)

(58) Field of Classification Search
    USPC ................. 709/204, 206; 379/88.18, 68, 76; 704/260, 255; 455/413; 370/465
    See application file for complete search history.

(56) References Cited

U.S. PATENT DOCUMENTS

| | | | |
|---|---|---|---|
| 2002/0193996 A1* | 12/2002 | Squibbs et al. ............... | 704/260 |
| 2003/0002633 A1 | 1/2003 | Kredo et al. | |
| 2004/0023643 A1* | 2/2004 | Vander Veen ...... | H04M 1/7255 455/413 |
| 2004/0120344 A1* | 6/2004 | Sato .................... | H04L 12/2803 370/465 |
| 2005/0076150 A1 | 4/2005 | Lee et al. | |
| 2006/0282503 A1* | 12/2006 | Gwozdz ............... | G06Q 10/107 709/206 |
| 2007/0162283 A1* | 7/2007 | Petrushin ................ | G10L 17/26 704/255 |
| 2007/0203979 A1* | 8/2007 | Walker et al. ................ | 709/204 |
| 2008/0256206 A1 | 10/2008 | Lee et al. | |
| 2008/0256210 A1* | 10/2008 | Malik .................... | H04L 51/12 709/206 |
| 2009/0154668 A1* | 6/2009 | Hao et al. .................. | 379/88.18 |
| 2010/0182994 A1 | 7/2010 | Rahman et al. | |
| 2011/0021178 A1* | 1/2011 | Balasaygun ............ | G10L 17/26 455/413 |
| 2011/0085648 A1 | 4/2011 | Maeng et al. | |

OTHER PUBLICATIONS

PCT/ISA/210 Search Report issued on PCT/KR2012/003647 (pp. 3).
European Search Report dated Feb. 25, 2015 issued in counterpart application No. 12783015.6-1862.
European Search Report dated Nov. 28, 2014 issued in counterpart application No. 12783015.6-1862.
Chinese Office Action dated Feb. 25, 2016 issued in counterpart application No. 201280034151.8, 20 pages.

* cited by examiner

[Fig. 1]
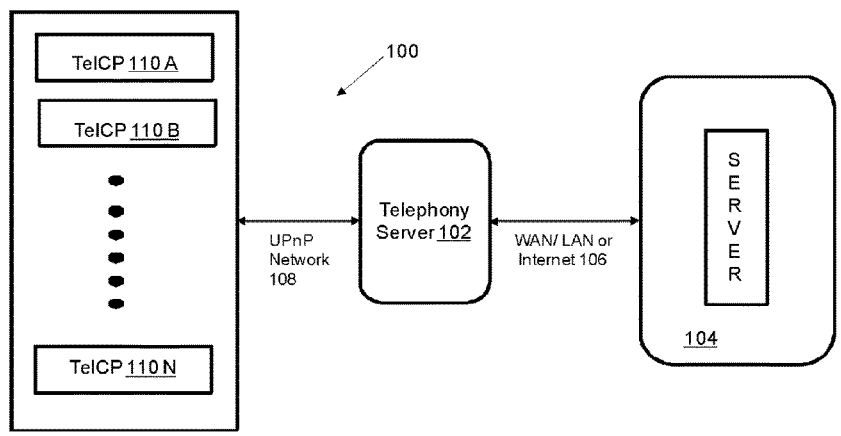
[Fig. 2]
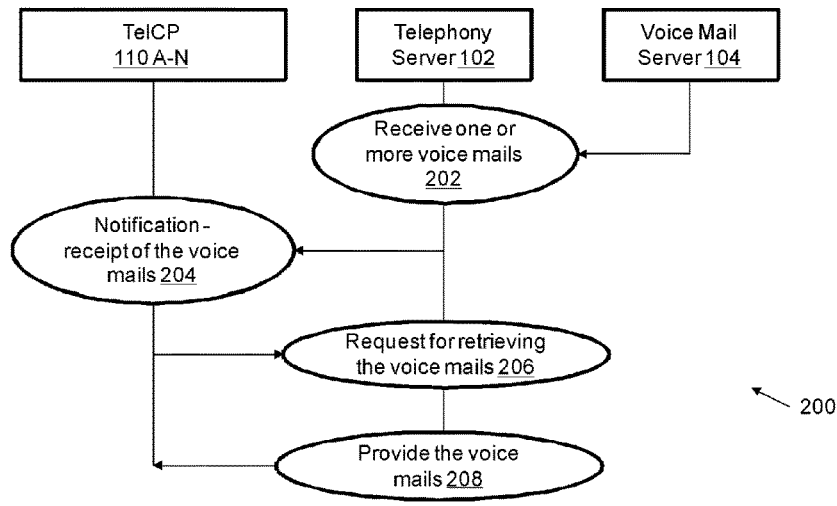
[Fig. 3]
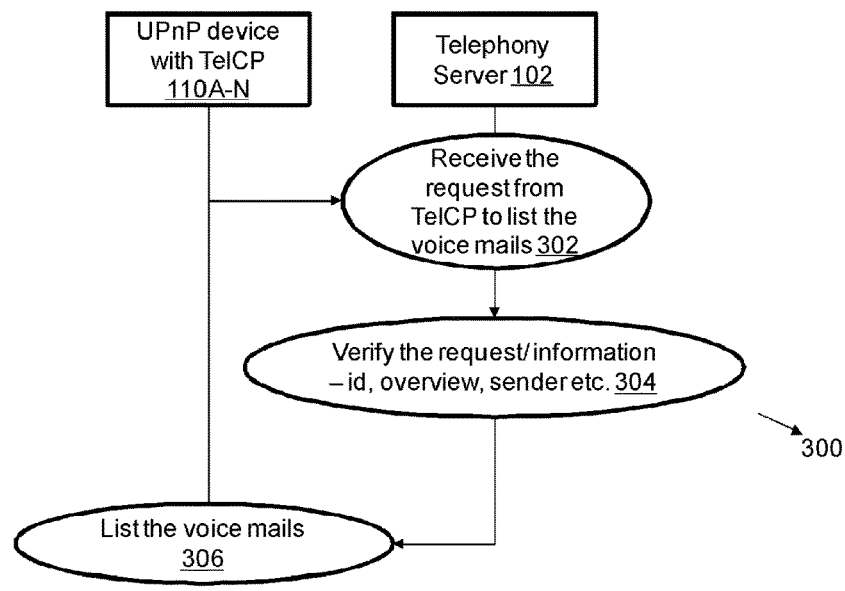

[Fig. 4]
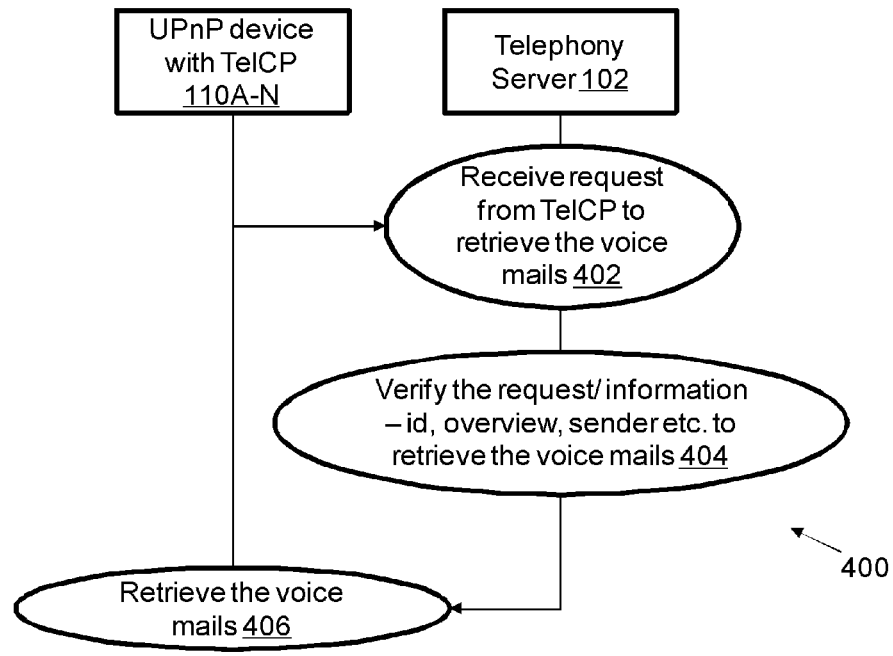
[Fig. 5]
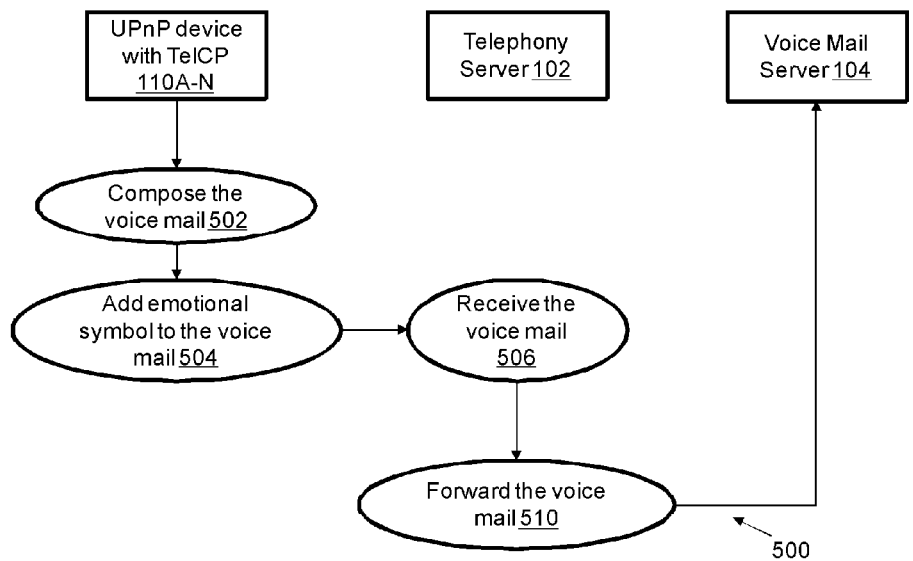

[Fig. 6]
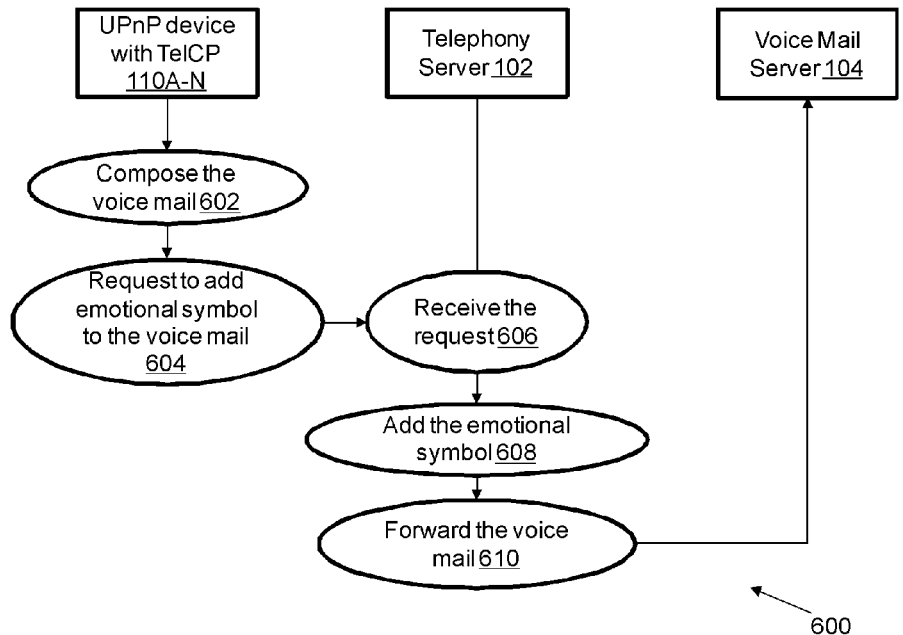
[Fig. 7]
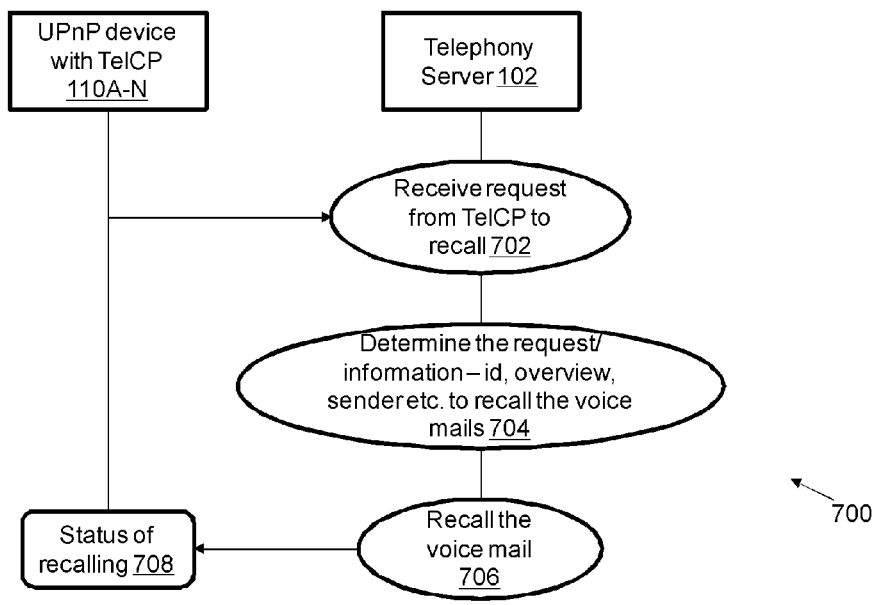

[Fig. 8]
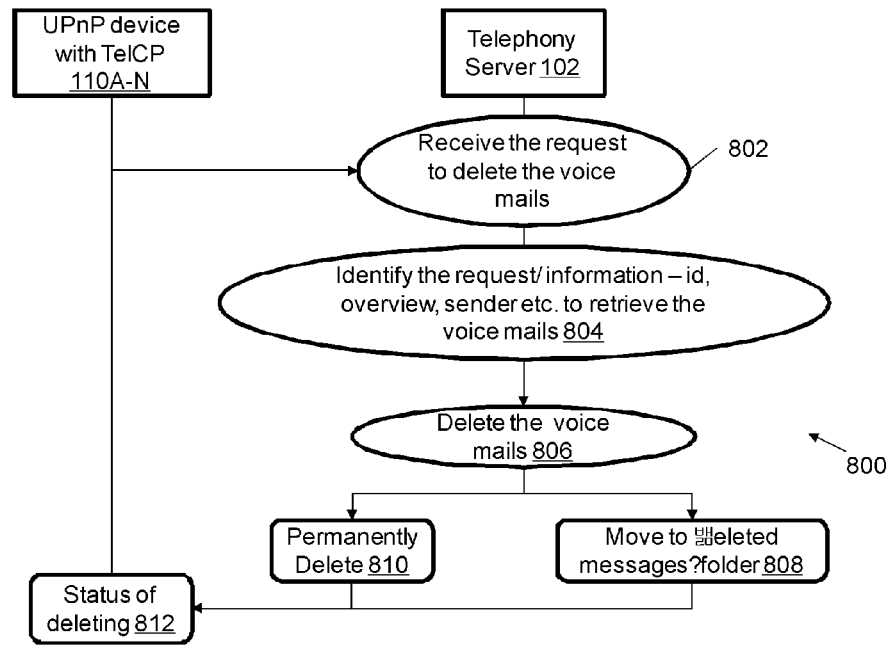
[Fig. 9]
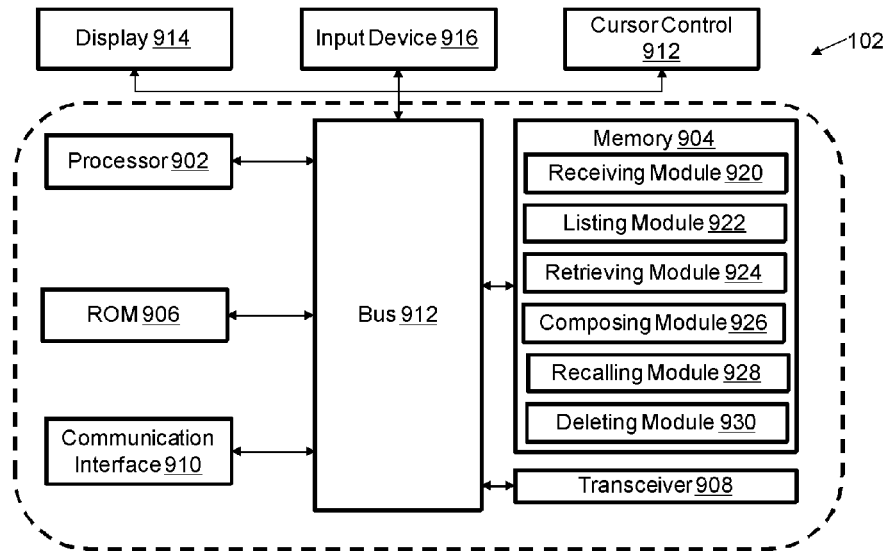

METHOD AND SYSTEM FOR MANAGING VOICE MAILS IN A UNIVERSAL PLUG AND PLAY NETWORK ENVIRONMENT

TECHNICAL FIELD

The present invention generally relates to Universal Plug and Play (UPnP) telephony. More particularly, the present invention relates to managing voice mails in a UPnP network environment.

BACKGROUND ART

Universal Plug and Play (UPnP) is a set of network protocols that is created to let electronic devices to detect and function within a networking environment. UPnP network allows the electronic devices to connect seamlessly and simplifies implementation of networks in home data sharing, communications, and entertainment and corporate environments. UPnP achieves this by defining and publishing UPnP device control protocols built upon open, Internet-based communication standards. Though it is widely known to connect devices using UPnP network protocols, the area of applications is still to be explored.

Further, an UPnP network architecture allows peer-to-peer networking of personal computers (PCs), networked appliances, and wireless devices. The architecture is a distributed and an open architecture based on established standards (e.g., UPnP telephony device/IP, UDP, HTTP and XML). The architecture may also support zeroconfiguration networking. A UPnP compatible device from an entity can dynamically join the UPnP network, may obtain an IP address, announce its name, convey its capabilities upon request or by default, and learn regarding presence and capabilities of other devices present in the network.

Further, UPnP devices can leave the network automatically without providing any unwanted state information. The UPnP network protocol provides discovery, control and creating event mechanisms as known to the person skilled in the art. A first step of discovery is enabled using Simple Service Delivery (SSD) protocol. All control messages are in the form of extended markup language (referred symbolically as XML). Creating events follows General Event Notification Architecture (GENA) protocol. Using these functions, the UPnP provides a real time availability and unavailability related information of the UPnP devices to the other devices in the network.

Furthermore, the UPnP network protocols provides telephony services for extending user experience in a home to access telephony services like messaging service, presence service, and call handling service. As analogous to UPnP Device Architecture (DA), telephony defines three kinds of devices, viz. a telephony server that provides messaging, and presence related services to the user, a telephony control point (UPnP telephony device) to initiate actions provided by the telephony server and a telephony client device (TC) for media related handling and providing input and output to or from the TS.

The UPnP telephony services enables a user to initiate/receive a call to any user outside the UPnP network using a Wide Area Network (WAN) calling technology like Voice Over Internet Protocol (VOIP) or other calling technologies. In spite of developments in the UPnP technology, there are still areas of application that are to be explored. One such area is the application of UPnP technology for managing voice mails in the UPnP network.

DISCLOSURE OF INVENTION

Technical Problem

The present invention provides a method and system for managing voice mails in a Universal Plug and Play (UPnP) home network environment.

Solution to Problem

In one aspect, a method includes receiving the one or more voice mails at a Telephony Server (TS) from a voice mail sever, sending a notification indicating receipt of the one or more voice mails to one or more Telephony Control Points (TelCPs) through a Universal Plug and Play (UPnP) home network, receiving a request for retrieving the one or more voice mails from the one or more TelCPs in response to the notification, and providing the one or more voice mails to the one or more TelCPs through the Universal Plug and Play (UPnP) home network based on the request. The method further includes receiving a request for listing the one or more voice mails from the one or more TelCPs, verifying information associated with the request to identify the one or more voice mails, and providing a list including the one or more voice mails to the one or more TelCPs.

In another aspect, a system includes one or more Telephony Control Points (TelCPs), and a Telephony Server (TS) connected to the one or more TelCPs through a Universal Plug and Play (UPnP) network, wherein the TS is configured for sending a notification to the one or more TelCPs indicating receipt of the one or more voice mails, and wherein the TS is configured for receiving a request from the one or more TelCPs for retrieving the one or more voice mails, and wherein the TS is configured for providing the one or more voice mails to the one or more TelCPs through the UPnP network based on the request. The TS is further configured for receiving a request for listing the one or more voice mails from the one or more TelCPs, verifying information associated with the request to identify the one or more voice mails, and providing a list including the one or more voice mails to the one or more TelCPs.

Yet another embodiment of the present invention is directed to a device for managing the one or more voice mails. The device includes a processor, and a memory coupled to the processor, wherein the memory includes a receiving module configured for receiving one or more voice mails at the TS from the voice mail sever, sending a notification indicating receipt of the one or more voice mails to the TelCP, receiving a request for retrieving the one or more voice mails from the TelCP in response to the notification, and providing the one or more voice mails to the TelCP through the UPnP network based on the request. The receiving module is further configured for generating the notification indicating the receipt of the one or more voice mails upon receiving the one or more voice mails from the voice mail server.

Other features of the embodiments will be apparent from the accompanying drawings and from the detailed description that follows.

BRIEF DESCRIPTION OF DRAWINGS

FIG. 1 illustrates a block diagram of a system for managing voice mails in a Universal Plug and Play (UPnP) home network environment, in accordance with an embodiment of the present invention, FIG. 2 is a flow diagram illustrating an exemplary method of providing voice mails to a telephony control points, in accordance with an embodiment of the present invention, FIG. 3 is a flow diagram illustrating an exemplary method of providing a list of voice mails received from the voice mail server, in accordance with an embodiment of the present invention, FIG. 4 is a flow diagram illustrating an exemplary method of retrieving voice mails from a Telephony Server, in accordance with an embodiment of the present invention, FIG. 5 is a process flow diagram illustrating an exemplary method of composing voice mails, in accordance with an embodiment of the present invention, FIG. 6 is a process flow diagram illustrating an exemplary method of composing voice mails, in accordance with another embodiment of the present invention, FIG. 7 is a flow diagram illustrating an exemplary method of recalling voice mails deposited in a voice mail server, in accordance with an embodiment of the present invention, FIG. 8 is a flow diagram illustrating an exemplary method of deleting the received voice mails in accordance with an embodiment of the present invention, FIG. 9 illustrates a block diagram representing a Telephony Server, in accordance with an embodiment of the present invention.

The drawings described herein are for illustration purposes only and are not intended to limit the scope of the present disclosure in any way.

Mode for the Invention

The present invention provides a method and system for managing voice mails in a Universal Plug and Play (UPnP) home network environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The term "voice mail" used herein after throughout the document refers to or includes messages with voice inputs, emails in voice formats, visual voice mails, visual mails, messages with voice, text and visual inputs as parts, emails with voice inputs or the like.

FIG. 1 illustrates a block diagram of a system 100 for managing voice mails in an UPnP home network environment, in accordance with an embodiment of the present invention. The system 100 includes a Telephony Server (TS) 102, a voice mail server 104, and Telephony Control Points (TelCPs) 110A-N.

The telephony server 102 is a logical device such as mobile phone, laptop, or any communication device that is capable of managing the one or more voice mails. The telephony server 102 may include one or more modules to manage the one or more voice mails.

The TelCPs 110A-N may include television device, mobile phone, a Portable Digital Access (PDA), or any other logical device having a user interface. One of the advantages of the present embodiment is, by using such logical devices at the position of the TelCP 110; users may obtain a flexibility of managing voice mails with much more user friendly devices.

The voice mail server 104 and the TS 102 are connected through one of the networking means such as Wide Area Network (WAN), Local Area Network (LAN), and the Internet. The telephony server 102 is connected to the TelCPs 110A-N through an UPnP home network 108.

In one embodiment, the telephony server 102 provides a voice mail notification to a telephony user on any of the TelCPs (for example, TelCP 110A) when a voice mail intended for the telephony server arrives at the telephony server 102. If the telephony user wishes to access the voice mail, the telephony server 102 provides the voice mail on the TelCP 110A. Also, the telephony server 102 enables the telephony user to view a list of voice mails, delete the received voice mails and so on.

In another embodiment, the telephony user can compose voice mail intended for remote user using the TelCP 110A and send the voice mail to the remote user via the telephony server 102. In yet another embodiment, the telephony user can recall one or more voice mails deposited in the voice mail server 104 via the telephony server 102 using the TelCP 110A.

The above described and other embodiments are described in greater detail in the description that follows.

FIG. 2 is a flow diagram illustrating an exemplary method of providing voice mails 200 to the TelCP 110A, in accordance with an embodiment of the present invention. At step 202, the TS 102 receives the one or more voice mails from the voice mail server 104. In one exemplary implementation, the TS 102 assigns a state variable "NewMessages" to the one or more voice mails received from the voice mail server 104. At step 204, the TS 102 sends a notification indicating receipt of the one or more voice mails to the TelCP 110A through the UPnP home network 108. The notification includes the state variables associated with the one or more voice mails. The state variables include "MessageID" which is associated with a unique identifier. The "MessageID" may be unique to each of the sender of the voice mails. For example, "MessageID" can be a number associated with the sender or a name assigned to the sender by the user of the TS 102. Before sending the notification to the TelCP 110A, the notification is generated at the TS 102 indicating the receipt of the voice mails upon receiving the one or more voice mails from the voice mail server.

At step 206, the TelCP 110A sends a request to the TS 102 for retrieving the one or more received voice mails in response to the notification. At step 208, the TS 102 provides the one or more voice mails to the TelCP 110A.

FIG. 3 is a flow diagram illustrating an exemplary method of providing a list of voice mails received from the voice mail server 104, in accordance with an embodiment of the present invention. At step 302, the TelCP 110A sends a request for providing a list of received voice mails to the TS 102. An interface (not shown in the figure) is provided in the TelCP 110A to facilitate the telephony user in providing inputs to list the voice mails. The interface may assist the telephony user in listing or searching the voice mails based on criterions that are present as associated information with the voice mails (arguments of "MessageList") such as Message IDs, class of the message, folder of the message, message status (read or unread), emoticon associated with the message, sender information, receiver information or the like. Each of the criterions or associated information for listing the voice mails are explained below:

a) Class of the message: This is a required field and indicates the class of Message i.e., Voice-Mail. "Voice-Mail" refers to an voice mail;

b) Subject or title of the voice mail: This can be optional and indicates a title of a voice mail; and c) Overview or emotion or emoticon of the voice mail: This can be optional and includes the emotion indication of the voice mail.

In an exemplary embodiment, "MessageList" is an argument for SearchMessages( ) action used in the request. For instance, in order to list all the received voice mails, the SearchMessages( ) action includes argument values as "MessageClass"=Voice-Mail, MessageFolder (folder of the message or the voice mail sent, received, deleted etc) is "Received", MessageStatus=empty [denoted as " "]. This type of entry would list all the voice mails that are present in "received" folder with an empty status. In another instance, in order to list all the new voice mails which has emotion indication as happy, the SearchMessages( ) action includes argument values as MessageClass=Voice-Mail, MessageFolder=Received; MessageStatus=unread, and MessageEmotion=happy. In yet another instance, if the argument is "GetNewMessagesO", the action may be used to list all the new messages including voice mails.

At step 304, the TS 102 verifies the associated information in the request. For example, the request may be verified for acceptable format of the associated information or to determine whether the request contains suitable criterions required for listing the voice mails. At step 306, the TS 102 provides a list of voice mails such that the list of voice mails is displayed at the TelCP 110A. Thus, after listing the voice mails at the TelCP 110A, the telephony user may be able to better view the voice mails and perform management of the voice mails with ease.

FIG. 4 is a flow diagram illustrating an exemplary method of retrieving voice mails from the TS 102, in accordance with an embodiment of the present invention. At step 402, the TelCP 104A sends a request to retrieve the voice mails to the TS 102. In one exemplary implementation, an interface (not shown in the figure) present in the TelCP 110A facilitates the user to retrieve one or more voice mails from the TS 102. The request is provided with the associated information to facilitate retrieving one or more specific voice mails out of the total number of voice mails received from the voice mail server 104. In an embodiment of the present invention, the associated information provided by the user may be "MessageID" (a unique identifier to a sender). At step 404, the TS 102 verifies the request along with the associated information with an existing data for acceptance and to identify the specific one or more voice mails from the voice mails. At step 406, the TS 102 provides the one or more specific voice mails to the TelCP 110A.

FIG. 5 is a process flow diagram illustrating an exemplary method of composing voice mails, in accordance with an embodiment of the present invention. At step 502, the TelCP 110A enables the telephony user to compose the voice mail. At step 504, the TelCP 504 adds an emotional symbol, a characteristic of the voice mail, to the voice mail. In accordance with the present embodiment, the emotional symbol for the voice mails is added at the TelCP 110. In accordance with an exemplary embodiment, a group of emotional symbols can be provided to the user to select one among the group of the emotional symbols. In accordance with another exemplary embodiment of the present invention, the user may be allowed to create the emotional symbol, characteristic to each of the voice mails. At step 506, the TelCP 110A sends the composed voice mail to the TS 102. At step 508, the voice mails are forwarded by the TS 102 to the voice mail server 104. Thereafter, the voice mail server 104 forwards the voice mail to one or more intended recipients.

FIG. 6 is a flow diagram illustrating an exemplary method of composing voice mails, in accordance with another embodiment of the present invention. At step 602, the TelCP 110A allows the user to initiate composing of the voice mail. At step 604, the TelCP 110A sends composed voice along with a request to add an emotional symbol to the composed voice mail to the TS 102. At a step 606, the TS 102 adds an emotional symbol, characteristic to the each of the voice mails, to the composed voice mail. At step 608, the TS 102 forwards the voice mails containing the emotional symbol to the voice mail server 104. Thereafter, the voice mails server 104 forwards the voice mail to one or more intended recipients.

FIG. 7 is a flow diagram illustrating an exemplary method of recalling voice mails deposited in the voice mail server 102, in accordance with an embodiment of the present invention. At step 702, the TelCP 110A sends a request for recalling a voice mail deposited in the voice mail server 104. In one embodiment, the TelCP 110A sends a recall action "RecallMessageQ" in the request to the TS 102. The request includes associated information to facilitate recalling the voice mails. In an embodiment, the associated information provided by the user along with the request may be "MessageID" of the voice mails. At step 704, a determination is carried out based on the request and the associated information to determine the specific voice mails out of a group of voice mails to be recalled. At step 706, the TS 102 attempts to recall the request voice mail from the voice mail server 104. At step 708, the TS 102 notifies the status of recalling the voice mail to the TelCP 110A. For example, if the voice mail is successfully recalled, the TS 102 notifies the TelCP 110A that the voice mail is recalled successfully from the voice mail server 104. In case recall attempt failed, the TS 102 notifies the TelCP 110A that the attempt to recall the voice mail failed.

FIG. 8 is a flow diagram illustrating an exemplary method of deleting the received voice mails in accordance with an embodiment of the present invention. At step 802, the TelCP 110A sends a request for deleting one or more voice mails received from the voice mail server 104 to the TS 102. For example, the request is received along with the associated information such as "MessageID", overview, sender name, or any other state variables associated with the voice mails. At step 804, the TS 102 identifies the voice mails to be deleted based on the request. At step 806, the TS 102 determines whether the voice mails are to be permanently deleted or moved to "deleted messages" folder. In an embodiment, when the TS 102 is supported by a message service, the voice mails that are required to be deleted are moved to "deleted messages" folder, at step 808. At step 810, when the TS 102 is not supported by the message service, the voice mails are permanently deleted from the TS 102. At step 812, the TS 102 updates the TelCP 110A on the status of deleting the voice mails.

FIG. 9 illustrates a block diagram of the TS 102 in accordance with an embodiment of the present invention. In FIG. 9, the TS 102 includes a processor 902, memory 904, a Read Only Memory (ROM) 906, a transceiver 908, a bus 910, a communication interface 912, a display 914, an input device 916, and a cursor control 918. In an embodiment, the TS 102 is a device comprising a processor 902 and the memory 904 with one or more modules including a receiving module 920.

The processor 902, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 902 may also include embedded controllers, such as generic or programmable logic devices or arrays, application specific integrated circuits, single-chip computers, smart cards, and the like.

The memory 904 may be volatile memory and non-volatile memory. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling memory cards, Memory Sticks™, and the like.

According to the present invention, the memory 904 includes the receiving module 920, a listing module 922, a retrieving module 924, a composing module 926, a recalling module 928, and a deleting module 930. Each of the modules perform a set of functions as desired by the user of the TelCP 110A. The receiving module 920 is configured to perform a set of functions related to the receiving of the voice mails (explained in detail with reference to FIG. 2). In accordance with an embodiment, the receiving module 920 is configured for sending a notification to Telephony Control Points (TelCPs) indicating receipt of the one or more voice mails. The receiving module 920 is further configured for receiving a request from the TelCPs for retrieving the voice mails, and providing the one or more voice mails to the TelCPs through the UPnP network 108 based on the request. The listing module 922 is configured to perform a set of functions related to the listing of the voice mails (explained in detail with reference to FIG. 3).

In accordance with an embodiment, the listing module 922 is configured for receiving a request for listing the one or more voice mails from the one or more TelCPs. The listing module 922 further configured for verifying information associated with the request to identify the one or more voice mails, and providing a list including the one or more voice mails to the one or more TelCPs. The retrieving module 924 is configured to perform a set of functions related to the retrieving of the voice mails (explained in detail with reference to FIG. 4).

In accordance with an embodiment, the retrieving module 924 is configured for receiving a request for retrieving the one or more voice mails from the one or more TelCPs. The retrieving module 924 is further configured for verifying information associated with the request to facilitate retrieving of the voice mails, and providing the voice mails to the TelCPs based on the request. The composing module 926 is configured to perform a set of functions related to the composing of the voice mails (explained in detail with reference to FIG. 5 and FIG. 6). In accordance with an embodiment, the composing module 926 is configured for composing the voice mails with the aid of the TelCPs, adding an emotional symbol to at least one of the one or more voice mails, and forwarding the one or more voice mails from the TS to a voice mail server, wherein the one or more voice mails are targeted to one or more receivers. The recalling module 928 is configured to perform a set of functions related to the recalling of the voice mails (explained in detail with reference to FIG. 7).

In accordance with an embodiment, the recalling module 928 is configured for receiving from the TelCP a request for recalling the voice mails deposited in the voice mail server. The request indicates information associated with the one or more voice mails to be recalled. The recalling module 928 is further configured for determining the at least one voice mail to be recalled based on the information in the request, and attempting to recall the at least one voice mail of the one or more voice mails deposited in the voice mail server. Further, the recalling module 928 is configured to determine whether the attempt to recall the at least one voice mail is successful. If yes, a notification is sent indicating that the at least one voice mail is successfully recalled. If the attempt is not successful, a notification indicating failure is sent to recall the at least one voice mail. The deleting module 930 is configured to perform a set of functions related to the deleting of the voice mails (explained in detail with reference to FIG. 8). In accordance with an embodiment, the deleting module 930 is configured for receiving a request for deleting the one or more voice mails from the one or more TelCPs, wherein the request comprises information associated with the one or more voice mails. The deleting module 930 is further configured for identifying the one or more voice mails to be deleted based on the information associated with the voice mails, and deleting the one or more voice mails from the memory 904.

Embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 902. For example, a computer program may include machine-readable instructions capable of providing enhanced event notifications, receiving the requests, sending the requests, verifying the requests, listing the voice mails, retrieving the voice mails, modifying the voice mails, recalling the voice mails, deleting the voice mails, composing the voice mails, the voice mails in the UPnP home networking environment 108, according to the teachings and herein described embodiments of the present subject matter. In one embodiment, the computer program may be included on a storage medium and loaded from the storage medium to a hard drive in the non-volatile memory.

The components such as the transceiver 908, communication interfaces 912, the display 914, the input device 916, and the cursor control 918 are well known to the person skilled in the art and hence the explanation is thereof omitted.

The present embodiments have been described with reference to specific example embodiments, it will be evident that various modifications and changes may be made to these embodiments without departing from the broader spirit and scope of the various embodiments. Furthermore, the various devices, modules, selectors, estimators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

The invention claimed is:

1. A method for managing one or more voice mails by a telephony server in a universal plug and play (UPNP) home network, the method comprising:
   discovering one or more telephony control points (TelCPs) by using a simple service delivery (SSD) protocol;
   establishing a UPNP session with the one or more TelCPs based on hypertext transport protocol (HTTP);
   providing at least one interface to a logical device included in the one or more TelCPs, wherein the at least one interface is configured to manage the one or more voice mails through the telephony server;
   receiving a control message in extended markup language (XML) format; and
   transmitting an event notification message in the XML format according to general event notification architecture (GENA) protocol,
   wherein the one or more TelCPs are configured to manage the one or more voice mails through the telephony server by using the at least one interface,
   wherein the method further comprises:
      receiving one or more voice mails from a voice mail server;
      transmitting, to the one or more TelCPs, based on the at least one interface, a notification message indicating receipt of the one or more voice mails;
      receiving, based on the at least one interface, from the one or more TelCPs, a first control message which is an action message in order to list at least one first voice mail associated with a first criterion, the first control message including the first criterion;
      providing, based on the at least one interface, a list of the at least one first voice mail to the one or more TelCPs;
      receiving, from the one or more TelCPs, based on the at least one interface, a fifth control message which is an action message in order to add emotional symbol to at least one fifth voice mail;
      receiving, based on the at least one interface, the at least one fifth voice mail from the one or more TelCPs;
      adding emotional symbol to the at least one fifth voice mail based on the fifth control message;
      forwarding the at least one fifth voice mail to the voice mail server;
      receiving, from the one or more TelCPs, based on the at least one interface, a fourth control message which is an action message in order to recall at least one fourth voice mail associated with a fourth criterion from among the at least one fifth voice mail, the fourth control message including the fourth criterion, wherein the fourth criterion includes a message identifier, an overview and the emotional symbol;
      recalling the at least one fourth voice mail based on the fourth control message; and
      transmitting, based on the at least one interface, a status of recalling the at least one fourth voice mail to the one or more TelCPs.

2. The method of claim 1, further comprising:
   receiving, from the one or more TelCPs, based on the at least one interface, a second control message which is an action message in order to retrieve at least one second voice mail associated with a second criterion from among the at least one first voice mail, the second control message including the second criterion; and
   providing, based on the at least one interface, the at least one second voice mail to the one or more TelCPs.

3. The method of claim 1, further comprising:
   receiving, from the one or more TelCPs, based on the at least one interface, a third control message which is an action message in order to delete at least one third voice mail associated with a third criterion from among the at least one first voice mail, the third control message including the third criterion;
   deleting the at least one third voice mail based on the third control message; and
   transmitting, based on the at least one interface, a status of deleting the at least one third voice mail to the one or more TelCPs.

4. The method of claim 3, wherein deleting the at least one third voice mail based on the third control message comprises:
   determining whether to permanently delete the at least one third voice mail based on the third control message;
   if so, permanently deleting the at least one second voice mail from the memory; and
   if not, moving the at least one second voice mail to a predetermined location.

5. A telephony server for managing one or more voice mails in a universal plug and play (UPNP) home network, the telephony server comprising:
   a memory; and
   a processor coupled to the memory;
   wherein the processor is configured to:
   discover one or more telephony control points (TelCPs) by using a simple service delivery (SSD) protocol;
   establish a UPNP session with the one or more TelCPs based on hypertext markup language (HTTP);
   provide at least one interface to a logical device included in the one or more TelCPs, wherein the at least one interface is configured to manage the one or more voice mails through the telephony server;
   receive a control message in extended markup language (XML) format; and
   transmit an event notification message in XML format according to general event notification architecture (GENA) protocol,
   wherein the one or more TelCPs are configured to manage the one or more voice mails through the telephony server by using the at least one interface, and
   wherein the processor is further configured to:
      receive one or more voice mails from a voice mail server;
      transmit, to the one or more TelCPs, based on the at least one interface, a notification message indicating receipt of the one or more voice mails;
      receive, based on the at least one interface, from the one or more TelCPs, a first control message which is an action message in order to list at least one first voice mail associated with a first criterion, the first control message including the first criterion; and
      provide, based on the at least one interface, the at least one first voice mail to the one or more TelCPs;
      receive, from the one or more TelCPs, based on the at least one interface, a fifth control message which is an action message in order to add emotional symbol to at least one fifth voice mail;
      receive, based on the at least one interface, the at least one fifth voice mail from the one or more TelCPs;
      add emotional symbol to the at least one fifth voice mail based on the fifth control message;
      forward the at least one fifth voice mail to the voice mail server;

receive, from the one or more TelCPs, based on the at least one interface, a fourth control message which is an action message in order to recall at least one fourth voice mail associated with a fourth criterion from among the at least one fifth voice mail, the fourth control message including the fourth criterion, wherein the fourth criterion includes a message identifier, an overview and the emotional symbol;

recall the at least one fourth voice mail based on the fourth control message; and transmit, based on the at least one interface, a status of recalling the at least one fourth voice mail to the one or more TelCPs.

6. The telephony server of claim 5, wherein the processor is further configured to:

receive, from the one or more TelCPs, based on the at least one interface, a second control message which is an action message in order to retrieve at least one second voice mail associated with a second criterion from among the at least one first voice mail, the second control message including the second criterion; and provide, based on the at least one interface, the at least one second voice mail to the one or more TelCPs.

7. The telephony server of claim 5, wherein the processor is further configured to:

receive, from the one or more TelCPs, based on the at least one interface, a third control message which is an action message in order to delete at least one third voice mail associated with a third criterion from among the at least one first voice mail, the third control message including the third criterion;

delete the at least one third voice mail based on the third control message; and transmit, based on the at least one interface, a status of deleting the at least one third voice mail to the one or more TelCPs.

8. The telephony server of claim 7, wherein the processor is further configured to:

determine whether to permanently delete the at least one third voice mail based on the third control message;

delete the at least one second voice mail from the memory permanently, if so; and move the at least one second voice mail to a predetermined location, if not.

* * * * *